(12) United States Patent
Itakura et al.

(10) Patent No.: US 7,129,439 B2
(45) Date of Patent: Oct. 31, 2006

(54) RESIN MOLDED BODY JOINING METHOD

(75) Inventors: Masahiko Itakura, Tokyo (JP);
Hiroshi Sagane, Osaka (JP); Yuichi Oe, Osaka (JP)

(73) Assignee: Daicel Polymer Ltd., Tokyo (JP)

( * ) Notice: Subject to any disclaimer, the term of this patent is extended or adjusted under 35 U.S.C. 154(b) by 0 days.

(21) Appl. No.: 11/157,065

(22) Filed: Jun. 20, 2005

(65) Prior Publication Data
US 2005/0279738 A1  Dec. 22, 2005

(30) Foreign Application Priority Data
Jun. 21, 2004  (JP) .............................. 2004-182603

(51) Int. Cl.
*B23K 26/00* (2006.01)
*B32B 37/00* (2006.01)

(52) U.S. Cl. ............................ 219/121.64; 219/121.63; 156/272.8

(58) Field of Classification Search ...................... None
See application file for complete search history.

(56) References Cited

U.S. PATENT DOCUMENTS 3,271,239 A * 9/1966 Hornbostel, Jr. ............. 162/169
4,371,579 A * 2/1983 McCaskey et al. .......... 428/204
4,550,238 A * 10/1985 Van Herle et al. ....... 219/121.63
6,759,458 B1 * 7/2004 Reil .............................. 524/89
2004/0045663 A1 * 3/2004 Katayama et al. ......... 156/272.8
2004/0112519 A1 * 6/2004 Mori ........................ 156/272.8
2004/0144483 A1 * 7/2004 Sugawara et al. ........ 156/272.8
2005/0081991 A1 * 4/2005 Hatase et al. ............. 156/272.8

FOREIGN PATENT DOCUMENTS

JP    62-49850    10/1987
JP    2001-71384   3/2001

* cited by examiner

*Primary Examiner*—Lynne R. Edmondson
(74) *Attorney, Agent, or Firm*—Flynn, Thiel, Boutell & Tanis, P.C.

(57) ABSTRACT

The present invention provides a joining method using a method of laser welding wherein two resin molded bodies can be joined with high welding strength. Specifically, this is a method that joins two thermoplastic resin molded bodies using a method of laser welding; the first resin molded body is a laser light transmissive molded body comprising a thermoplastic resin and cellulose fibers with an α-cellulose content of 80% or more; the second resin molded body is a laser light absorbent molded body containing a thermoplastic resin and a colorant; and the first resin molded body and the second resin molded body are welded by irradiating laser light from the first resin molded body side.

4 Claims, 1 Drawing Sheet

RESIN MOLDED BODY JOINING METHOD

FIELD OF THE INVENTION

The present invention relates to a method of joining two thermoplastic resin molded bodies using a method of laser welding.

PRIOR ART

Laser welding has gained attention as a method to resolve problems found with the methods generally used for joining resin molded bodies such as ultrasonic welding, hot plate welding, adhesive joining and fastening with screws, etc. There is the problem that laser welding can only be applied when the colors of the resin molded bodies to be joined are different (JP-B 62-49850), and JP-A 2001-71384 is known as a method to resolve this problem.

Disclosed in JP-A 2001-71384 is a technology to weld a first resin member with a second resin member using laser light, and disclosed in Examples is a method to weld black resin members, which have been colored using common dyes and carbon black.

However, in the description, the first resin member preferably has a transmittance of 95% or more in relation to the laser light that is irradiated, and the second resin is a resin that indicates sufficient absorbency in relation to the laser light and can be compounded of fillers comprised of inorganic and organic substances. In this way, the fact that, in order to maintain a high laser light transmittance, organic and inorganic reinforcements, etc. cannot be compounded in the first resin member is a restrictive factor in the application to broad utilization.

DISCLOSURE OF THE INVENTION

As described above, the fact that organic and inorganic reinforcements, etc. cannot be compounded in the first resin member is a restrictive factor when applying a method of laser welding, but further, from the perspective of processing waste materials, when incinerating waste materials after having been separated and recycled, it is desirable to compound organic reinforcements so that no combustion residues are produced. However, problems are posed in that cellulose fibers, which are well known as an organic reinforcement, have poor dispersion characteristics in resin molded bodies, adversely affecting the weld strength and detracting from the appearance of the molded body.

The present invention provides a joining method using a method of laser welding that can firmly join two resin molded bodies even when compounding cellulose fibers in a molded body positioned on the laser light irradiation side.

As a means to resolve these problems, the present invention provides a method to join two thermoplastic resin molded bodies using a method of laser welding wherein:

a first resin molded body is a laser light transmissive molded body comprising a thermoplastic resin and cellulose fibers with an α-cellulose content of 80% or more;

a second resin molded body is a laser light absorbent molded body containing a thermoplastic resin and a colorant; and the first resin molded body and the second resin molded body are welded by irradiating laser light from the first resin molded body side.

In the welding method of the present invention, when mixing the thermoplastic resin and the cellulose fibers, preferably the first resin molded body (or the first and second resin molded bodies) can be molded after separating the cellulose fibers and dispersing in the thermoplastic resin.

In the present invention, "laser transmittance" and "laser absorbency" are derived by the method described in Examples.

In addition to having a beautiful appearance with few so-called white spots irrespective of having been compounded with cellulose fiber, the resin molded bodies obtained by using the joining method of the present invention may be applied to a broader range of uses than in the past because cellulose fibers are contained, and because the mechanical properties such as bending elasticity are superior to resin molded bodies that do not contain reinforcements such as cellulose fiber.

Further, when using cellulose fibers, the molded body may be provided with a satisfactory balance between high laser transmittance and high bending elasticity, and there is also the advantage that after combustion no combustion residues are produced.

DETAILED DESCRIPTION OF THE INVENTION

The joining method of the present invention will be explained below in the order of processing steps, but the processing order and the procedures are not limited to the following explanation, and may be suitably modified.

(Process 1)

First, the first resin molded body and the second resin molded body which are targeted for joining are laminated, and then secured by a securing means such as a clamp, etc. Here, part or all of the contact surface of the first resin molded body and the second resin molded body is the part to be joined by welding.

The first resin molded body is a laser light transmissive molded body containing a thermoplastic resin and cellulose fibers with an α-cellulose content of 80% or more (simply called "cellulose fibers" hereinafter).

A small amount of inorganic reinforcement may be compounded in a range that can resolve the issues of the present invention, but preferably the total amount of cellulose fiber in the reinforcement is 50 mass percent or more; more preferably 70 mass percent or more; and even more preferably 85 mass percent or more. Essentially, 100 mass percent of cellulose fibers is most preferable.

The laser light transmittance of the first resin molded body is preferably 10% or more; 15% or more is more preferable; and 20% or more is even more preferable.

The shape, size and thickness, etc. of the first resin molded body may be suitably set in the range that fulfills the post-joining use and the aforementioned laser transmittance, but even with a material having low laser light transmittance, a reduction in welding characteristics may be suppressed by using a thin molded body. Consequently, substances with low laser light transmittance may be used if joining a thin molded body corresponding to the application.

As thermoplastic resins, olefin resins (preferably polypropylene), styrene resins (homopolymer, AS resin, HIPS, etc.), styrene resins containing rubber (ABS resin, AES resin, ABSM resin, AAS resin, etc.), polyamide resin, polyethylene resin, polypropylene resin, polybutylene terephthalate resin, polyphenylene sulfide resin, polyether ether ketone resin, polyethylene terephthalate resin, polybutylene terephthalate resin, polyphenylene sulfide resin, polycarbonate resin, non-crystalline (transparent) nylon, liquid crystal polymer, (meth) acryl resins, polyacetal resin, polyphenylene ether resin, acrylonitrile styrene copolymer resin, etc. may be cited, and these thermoplastic resins may be used singly or with two or more kinds mixed. Moreover, copolymers or mixtures taking these polymers as the main body, thermoplastic resins in which rubber or elastomers such as rubber-like resins are compounded in these, and polymer alloys containing 10 weight % or more of these resins may also be cited.

Homopolymers are preferable as the polypropylene, but other olefin monomers such as ethylene, and copolymers with other monomers such as (meth) acrylate ester are satisfactory. When forming into copolymers, the amount of monomer to use other than the polypropylene (raw material standard) is preferably less than 50 mass %.

The percentage of α-cellulose contained in the cellulose fiber is 80% or more, and preferably 85% or more, and the problem of the present invention cannot be resolved by substances with less than 80% α-cellulose such as, for example, the well-known kenaf fiber and jute fiber.

A mean fiber diameter of 0.1 to 1000 µm is preferable, 100 µm or less is more preferable, 10 to 50 µm is further preferable, and 20 to 30 µm is most preferable.

A mean fiber length of 0.1 to 1000 mm is preferable, 0.2 to 500 mm is more preferable, 0.3 to 50 mm is further preferable, and 0.5 to 5 mm is most preferable.

The amount of cellulose fiber compounded in relation to 100 mass parts of thermoplastic resin is 1 to 500 mass parts, preferably 5 to 300 mass parts, more preferably 5 to 100 mass parts, and 10 to 50 mass parts is further preferable.

When obtaining a first resin molded body applying the present invention, the dispersion characteristics of the cellulose fiber into the thermoplastic resin are important. If these dispersion characteristics are insufficient, large clumps of cellulose fibers called "white spots" will appear at points in the surface of the molded body and will cause degradation of the external appearance. The generation of these "white spots" cannot be fully resolved by general double-screw extruders.

In order to suppress the generation of this kind of "white spot" when mixing the thermoplastic resin and the cellulose fiber, the present invention uses a method in which the first resin molded body is formed after separating the cellulose fibers and dispersing in the thermoplastic resin. Further, separating and dispersing include both the method of dispersing after separating, and the method of separating and dispersing in parallel. A preferable example of these methods (separating and dispersing method) will be explained next.

(Method 1)

Using thermoplastic resin and cellulose fibers in the aforementioned percentage range (preferably pre-mixed in advance), these are introduced into a Henschel mixer (for example, one manufactured by Mitsui Mining Co., Ltd., with a heater), and are heated while agitating. The conditions at this time are as follows.

A total of 1000 to 3000 g of thermoplastic resin and cellulose fibers are introduced into a 20-L mixing tank, and are kneaded for 10 to 30 minutes at a peripheral velocity of 10 to 50 m/sec in the vicinity of the melting temperature of the resin used.

(Method 2)

Fifty kilograms of premixed thermoplastic resin and cellulose fibers are introduced into a double-screw mixing extruder (for example, HTM-65 manufactured by CTE CO., Ltd., screw diameter 65 mm, with hot-cut (in water) cut), and is melted and kneaded at a screw speed of 200 to 800 rpm at a temperature near the melting point of the resin used.

A molded body with a beautiful external appearance and with the generation of "white spots" suppressed may be obtained by applying this kind of separation and dispersion method to obtain the first resin molded body. In the present invention, the number of unseparated or separated cellulose fiber clumps with a maximum diameter or maximum length of 1 mm or more is preferably 10 clumps or less per 50 $cm^2$ of molded body surface area of the first resin molded body, and more preferably 5 clumps or less. The maximum diameter means the diameter if a sphere, the lengthwise diameter if elliptical, and the maximum length if an irregular shape.

Further, compared to when using cellulose fibers with an α-cellulose content of less than 80%, for example, kanaf fibers or jute fibers, the heat stability when using cellulose fibers with an α-cellulose content percentage of 80% or more is better, and therefore there are almost no deposits (adhesions of fibers) produced in the mold when obtaining the molded body and almost no coloration of the molded product.

Laser light transmittance is lost when using inorganic reinforcements as necessary, and therefore, it is preferable to use a substance which has a refractive index close to that of the thermoplastic resin used in the first resin molded body. For example, when using polypropylene (the homopolymer has a refractive index 1.49; if a copolymer, a value near the aforementioned refractive index is preferable.), an inorganic reinforcement having a refractive index of 1.4 to 1.7 is more preferable, and a refractive index of 1.45 to 1.55 is further preferable.

Preferably, one or two or more of this kind of inorganic reinforcement may be selected from talc (refractive index 1.54 to 1.59), mica (refractive index 1.55 to 1.59), heavy calcium carbonate (refractive index 1.47 to 1.69), light calcium carbonate (refractive index 1.47 to 1.69), glass fibers (refractive index 1.46 to 1.56), glass flakes (refractive index 1.46 to 1.56), glass beads (refractive index 1.46 to 1.56), wollastonite (refractive index 1.63), barium sulfate (refractive index 1.64 to 1.65), alumina (refractive index 1.56), magnesium hydroxide (refractive index 1.54), bentonite (refractive index 1.52), calcium sulfate (dihydrate) (refractive index 1.52 to 1.53), basic magnesium carbonate (refractive index 1.50 to 1.53), hydrous calcium silicate (refractive index 1.47 to 1.50), and wet-processed white carbon (refractive index 1.44 to 1.50).

The inorganic reinforcement may be used in an indeterminate shape such as granules, fibers or flakes, etc. When using granules, it is preferable to have a mean particle size of 0.01 to 100 µm. When using fibers, it is preferable to have mean diameter of 0.1 to 100 µm and mean length of 1 to 100 µm. When using flakes, it is preferable to have a maximum length of 5000 µm or less.

Colorants of types and in a range that do no cause loss of laser light transmittance may be compounded into the first resin molded body.

The second resin molded body is a laser light absorbent molded body containing a thermoplastic resin and a colorant. The percentage of laser light transmittance of the thermoplastic resin molded body is preferably 0%.

The same substances as those previously mentioned may be cited as the thermoplastic resins, and carbon black, inorganic pigment, organic pigment, and dyes, etc. may be cited as the colorants. The amount of colorant compounded in relation to the thermoplastic resin is determined in relationship to the use of the molded body after joining and the laser light transmittance, etc., but in relation to 100 mass parts of thermoplastic resin, 0.001 to 10 mass parts of colorant is preferable, 0.01 to 5 mass parts is more preferable, and 0.05 to 5 mass parts is further preferable.

The aforementioned cellulose fibers and inorganic reinforcements may be compounded in the second resin molded body as necessary, and supplementary colorants, dispersants, stabilizers, plasticizers, modifiers, ultraviolet absorbing agents or light stabilizers, anti-oxidants, anti-static electricity agents, lubricants, releasing agents, crystallization promoters, crystal nucleus agents, and elastomers to improve shock resistance, etc. may be compounded in the first resin molded body and/or second resin molded body as necessary.

When compounding dyes into the first resin molded body, the colorant contained in the aforementioned dye and that in the second resin molded body are the same, but this colorant does not have to be black, and combinations of colors other than black may be used to match the application.

(Process 2)

Next, the contact surfaces between the first resin molded body and the second resin molded body are welded by irradiating laser light from the first resin molded body side onto the contact parts between the laminated first resin molded body and the second resin molded body.

The lasers used in the present invention may be ones having an oscillation wavelength of 800 to 1200 nm, and well-known lasers may be used such as YAG lasers, semiconductor lasers, glass lasers, ruby lasers, He—Ne lasers, nitrogen lasers, chelate lasers, and dye lasers. About 5 to 30 W is sufficient for the output of these lasers, but if welding a thick resin molded body, higher output lasers may be used.

The laser irradiation time and the distance between the irradiated object (first resin molded body and second resin molded body) are adjusted by taking into consideration the output of the laser, the thickness of the molded body, and the laser transmittance of the molded body.

The joint mechanism based on the method of joining resin molded bodies of the present invention will be explained. When the first resin molded body and the second resin molded body are aligned and laser light is irradiated from the first resin molded body side, the laser light passes through the first resin molded body and then arrives at the surface of the second resin molded body. At this time, because the generation of "white spots" in the first resin molded body has been suppressed, the transmittance of the laser light is stable (there is little fluctuation of the laser light transmittance through the resin molded body), and dependence on the size of the laser output can also be reduced.

The second resin molded body has laser light absorbance characteristics, and therefore, the laser light does not pass through the second resin molded body, and stops as energy at the boundary between the first resin molded body and the second resin molded body. As a result, melting is produced in association with the temperature increase at the boundary between the first resin molded body and the second resin molded body, and therefore both molded bodies are firmly joined.

In particular, because the generation of "white spots" in the first resin molded body has been suppressed, welding by the laser irradiation is easier and the weld strength is heightened because the percentage of close contact of the first resin molded body and the second resin molded body prior to irradiation appears to be higher than when numerous "white spots" (a number exceeding 10 spots/50 $cm^2$) are present at the contact surface of the first resin molded body and the second resin molded body.

Then, because cellulose fibers are compounded into the first resin molded body and the generation of "white spots" has been suppressed, the external appearance is beautiful; and because such properties as mechanical strength, etc. can be provided and adjusted, application to a variety of uses in a broader range of fields becomes possible.

According to the joining method of the present invention, irrespective of having compounded cellulose fibers, which were the cause of impairment of laser light transmittance in the past, high laser light transmittance can be maintained in the first resin molded body, which is the laser light transmission side, and as a result, the two thermoplastic resin molded bodies can be firmly joined. Further, the two resin molded bodies may be colored with the same or different colors as desired.

Figure 1:
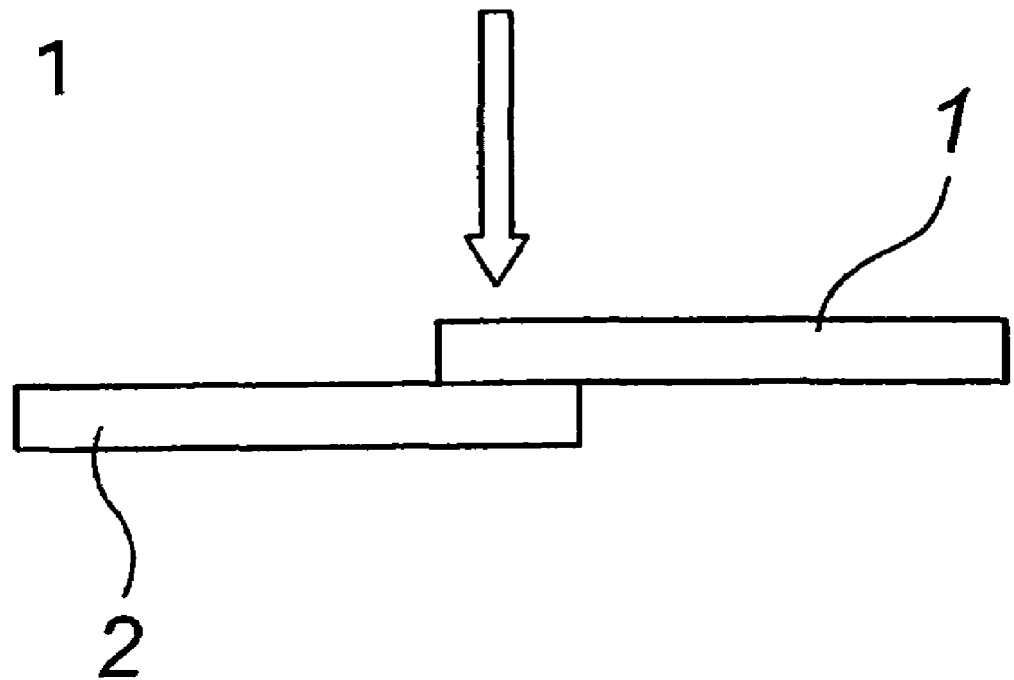
FIG. 1 is a diagram to explain the joining method of a resin molded body. Further, the code 1 in the diagram means a polypropylene molded body and 2 means a thermoplastic resin molded body, respectively.

EXAMPLES (Raw Materials Used in the Embodiment)

Polypropylene: PMB60A (manufactured by SunAllomer Ltd.)

Cellulose fibers: Sheets of dissolving pulp NDT-T (manufactured by Japan Paper Ltd.) made into 5-mm chips using a shredder (mean fiber diameter 20 to 40 μm, α-cellulose content 91%) were used.

Acid modified polypropylene: Umex 1010 (Sanyo Chemical Industries, Ltd.)

(Raw Materials Used in the Comparative Example)

Cellulose fiber 1: Kenaf fiber (cut length 5 mm fibers, α-cellulose content approximately 50%, manufactured by Nature Trust Co.)

Cellulose fiber 2: Jute fiber (cut length 3 mm fibers, α-cellulose content approximately 70%)

Carbon black: Product name Al-1000, manufactured by DIC Co.)

(Evaluation of Fiber Dispersion Characteristics)

A magnifying glass (10 times) was used to count the number of fiber clumps with a diameter of 1 mm or more (white spots) over one surface of the resin molded body (surface area 50 $cm^2$). In addition, the number of fiber clumps in which the maximum diameter (maximum length) was 1 mm or more (Comparative Examples 2, 3) was also counted in the same way.

(Method of Measuring Laser Light Transmittance)

When irradiating the resin molded body perpendicularly with laser light (wavelength 1064 nm, YAG laser, output 1.5 W) (Laser Marker, manufactured by NEC, Marker Engine SL475H), the laser light passing through the resin molded body and the laser light when no resin molded body was set up was received by a laser power meter (manufactured by Coherent, Lasermate10), the voltage (V) was measured by the tester connected to the laser power meter, and the voltage was taken as the intensity of the laser light as derived by the following formula.

Laser light transmittance (%)=(intensity (V) of laser light passing through the resin molded body/ intensity (V) of laser light irradiated on the resin molded body)×100

(Weld Strength)

Using welded test pieces, tensile tests were conducted with a Tensilon UCT-1T manufactured by Orientec Co. Ltd., and the maximum point load (units kg weight) was measured. Further, the measurements were taken using laser outputs of 40 W, 60 W, and 80 W.

(Observation of the Conditions in the Vicinity of the Welded Part)

The vicinity of the welded part was visually observed. Specifically, observations were made as to whether disintegration of the resin or cellulose fibers occurred and gas was produced when irradiated by the laser, and solidified gas components adhered in the vicinity of the welded part.

Examples 1 to 3, Comparative Examples 1 to 4

The components indicated in Table 1 (the values are displayed in mass percent except for the carbon black; carbon black is displayed in mass parts per total 100 mass parts of the other components) were used to obtain the raw material pellets by the following methods.

(Melting and Mixing Method, etc.)

Method 1 (Mixed Using a Henschel Mixer)

A total of 2000 g of the raw material components (first resin molded body or second resin molded body raw material components) were introduced into a Henschel mixer with heater, 20 L capacity manufactured by Mitsui Mining Co., Ltd., and were agitated for 20 minutes at 3000 rpm while heated to 140° C.

When the polypropylene began to melt, the contents were discharged into a separate connected mixer (cooler mixer), cooled while agitating, and granulated substance (diameter approximately 1 cm) comprising polypropylene and cellulose fibers was obtained. This granulated substance was pelletized by extruding from a hot-cut (in water) single-screw extruder (screw diameter 40 mm, using a full-flight screw).

Method 2 (High-Speed Mixing Extruder with Rotor)

After evenly mixing the raw material components (first resin molded body or second resin molded body raw material components), 50 kg were introduced into a double-screw high-speed mixing extruder (manufactured by CTE Co., Ltd., HTM-65, screw diameter 65 mm, with hot-cut (in water) cut). After melting and continuous mixing at a screw speed of 400 rpm, this mix was extruded and pelletized.

Method 3 (Double-Screw Extruder)

After evenly mixing the raw material components (first resin molded body or second resin molded body raw material components), 10 kg were introduced into a double-screw extruder (manufactured by Japan Steel Works Co., Ltd., TEX30, screw diameter 30 mm, with hot-cut (in water) cut). After melting and mixing at a screw speed of 400 rpm, this mix was extruded and pelletized.

(Manufacturing of the First Resin Molded Body and the Second Resin Molded Body)

Next, after the various raw material pellets were dried with hot air at 80° C. for 4 hours, sheet-shaped resin molded bodies (resin molded body 1 and resin molded body 2) with a length of 10 cm, width of 5 cm, and thickness of 2 mm were obtained by injection molding (manufactured by Sumitomo Heavy equipment Co., Ltd., SH100, cylinder temperature 200° C.).

(Laser Joining)

After combining the first resin molded body 1 and the second resin molded body 2 as indicated in FIG. 1 and securing with a clamp and a support member (not indicated in the diagram), a laser welder FD200 (semiconductor laser) manufactured by Fine Device Col., Ltd. was used perpendicularly to the contact part (direction of the arrow in the diagram), and laser light (output 40 W, 60 W, 80 W) was irradiated at 10 mm/sec. The laser spot diameter was 0.6 mm, and the laser light was irradiated to draw circles with a diameter of 1 cm.

TABLE 1

|  | Examples | | | Comparative Examples | | | |
| --- | --- | --- | --- | --- | --- | --- | --- |
|  | 1 | 2 | 3 | 1 | 2 | 3 | 4 |
| First resin molded body | | | | | | | |
| Polypropylene | 68 | 68 | 68 | 68 | 68 | 68 | 68 |
| Acid modified polypropylene | 2 | 2 | 2 | 2 | 2 | 2 | 2 |
| Dissolving pulp | 30 | 30 | 30 | — | — | — | 30 |
| Kenaf | — | — | — | 30 | — | 30 | — |
| Jute | — | — | — | — | 30 | — | — |
| Melting-mixing method | Method 1 | Method 2 | Method 1 | Method 3 | Method 3 | Method 1 | Method 3 |
| White spot count | 0 | 1 | 0 | 100 or more | 100 or more | 100 or more | 20 |
| Transmittance (maximum) (%) | 31 | 31 | 31 | 15 or less | 15 or less | 15 or less | 39 |
| Transmittance (minimum) (%) | 30 | 28 | 30 | 15 or less | 15 or less | 15 or less | 15 or less |
| Second resin molded body | | | | | | | |
| Polypropylene | 68 | 68 | 100 | 68 | 68 | 68 | 68 |
| Acid modified polypropylene | 2 | 2 | — | 2 | 2 | 2 | 2 |
| Dissolving pulp | 30 | 30 | — | — | — | — | 30 |
| Kenaf | — | — | — | 30 | — | 30 | — |
| Jute | — | — | — | — | 30 | — | — |
| Carbon black | 0.7 | 0.7 | 0.7 | 0.7 | 0.7 | 0.7 | 0.7 |
| Transmittance (%) | 0 | 0 | 0 | 0 | 0 | 0 | 0 |
| Weld strength (40 W) | 111 | 107 | 120 | 25 | No welding | No welding | No welding |
| Weld strength (60 W) | 114 | 110 | 125 | 55 | 25 | No welding | 55 |
| Weld strength (80 W) | 119 | 111 | 130 | 72 | 54 | 58 | 68 |
| Conditions in vicinity of joint | Satisfactory | Satisfactory | Satisfactory | Satisfactory | Adhesion of decomposed gas components was observed | Adhesion of decomposed gas components was observed | Satisfactory |

It was confirmed that the first resin molded body had a low white spot count and little fluctuation of transmittance because Method 1 or Method 2 was used. This means that the cellulose fibers were separated and uniformly dispersed.

Moreover, the weld strength of the first resin molded body and second resin molded body of Examples 1 to 3 indicated stable values irrespective of changes in the laser output.

The invention claimed is:

1. A method of joining two thermoplastic resin molded bodies by laser welding, comprising the steps of:
   providing a laser light transmissive first resin molded body comprising a thermoplastic resin and cellulose fibers with an α-cellulose content of at least 80%;
   providing a laser light absorbent second resin molded body comprising a thermoplastic resin and a colorant;
   bringing the first resin molded body into contact with the second resin molded body; and
   irradiating laser light through the first resin molded body to weld the first resin molded body to the second resin molded body.

2. The joining method according to claim 1, wherein at least the first resin molded body is obtained by molding after the cellulose fibers are separated and dispersed in the thermoplastic resin when mixing the thermoplastic resin and the cellulose fibers.

3. The joining method according to claim 1, wherein the mean fiber diameter of the cellulose fibers contained in the first resin molded body is 100 μm or less.

4. The joining method according to claim 1, wherein the number of unseparated or separated cellulose fiber clumps with a maximum diameter or maximum length of 1 mm or more is 10 clumps or less per 50 $cm^2$ of molded body surface area of the first resin molded body.

* * * * *